United States Patent [19]
Myers

[11] 3,906,969
[45] Sept. 23, 1975

[54] PORTABLE AWNING

[76] Inventor: Donald W. Myers, 11000 S.W. Boones Ferry Rd., Portland, Oreg. 97219

[22] Filed: Apr. 29, 1974

[21] Appl. No.: 465,287

[52] U.S. Cl. .............................. 135/5 A; 296/23
[51] Int. Cl.² .................................. E04F 10/06
[58] Field of Search........ 296/100, 136, 95 R, 23 R; 160/46, 23 R, 24; 135/5 A, 5 R, 5 AT

[56] References Cited
UNITED STATES PATENTS

| | | | |
|---|---|---|---|
| 1,112,003 | 9/1914 | Green | 296/23 R |
| 1,719,055 | 7/1929 | Herzer | 160/23 R |
| 2,377,553 | 6/1945 | Heck et al. | 160/24 |
| 2,473,058 | 6/1949 | Hoeldtke | 160/23 R |
| 2,859,756 | 11/1958 | Barnes | 135/5 A |
| 3,327,724 | 6/1967 | Nielsen | 135/5 AT |

Primary Examiner—Frank E. Werner
Assistant Examiner—Gary Auton
Attorney, Agent, or Firm—Oliver D. Olson

[57] ABSTRACT

An elongated hollow housing, adapted to be mounted on the side or end of a vehicle top by adjustable supports, contains therein a rotary shaft upon which is wound an elongated sheet of flexible awning material for retractable extension through an elongated slot in the housing registering with slots in the supports. Locking means interengages the shaft and housing for securing the shaft releasably against rotation in selected positions of extension of the awning. The outer transverse end of the awning material is reinforced by a rod the opposite ends of which releasably engage vertical posts which support the extended end of the awning in elevated position above the ground, and an anchor rope extends from each end of the rod angularly outward to the ground for stabilizing the vertical posts.

4 Claims, 5 Drawing Figures

US Patent  Sept. 23, 1975  3,906,969
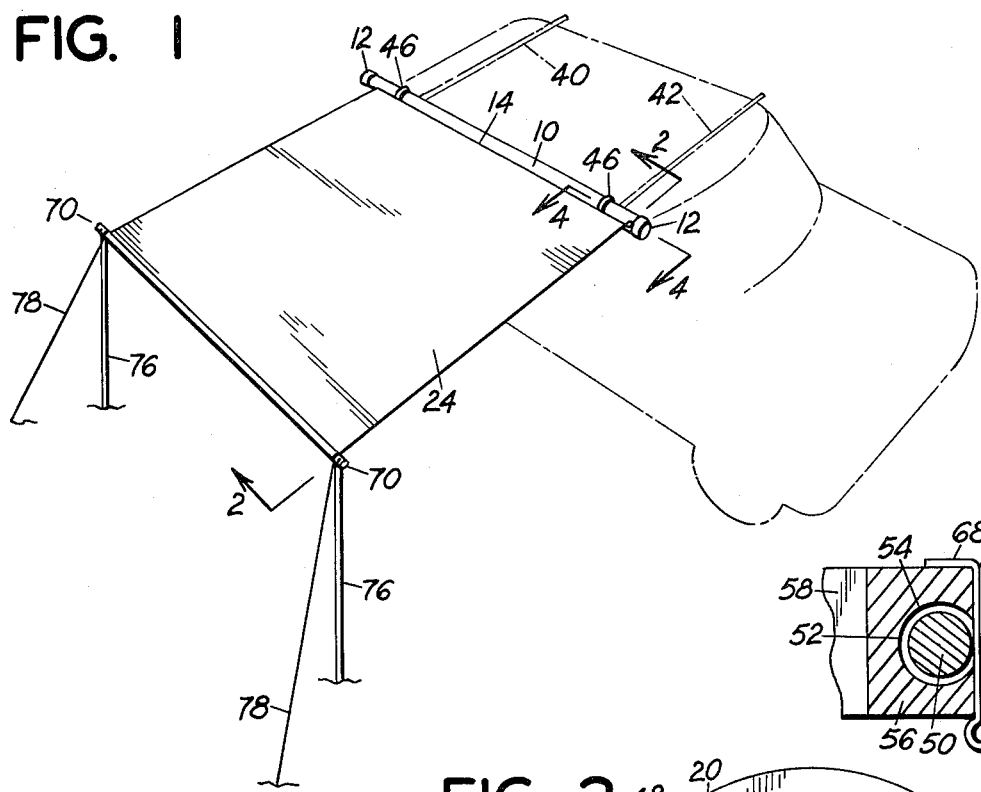
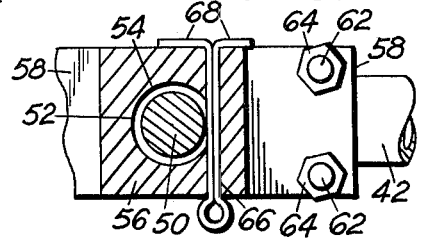
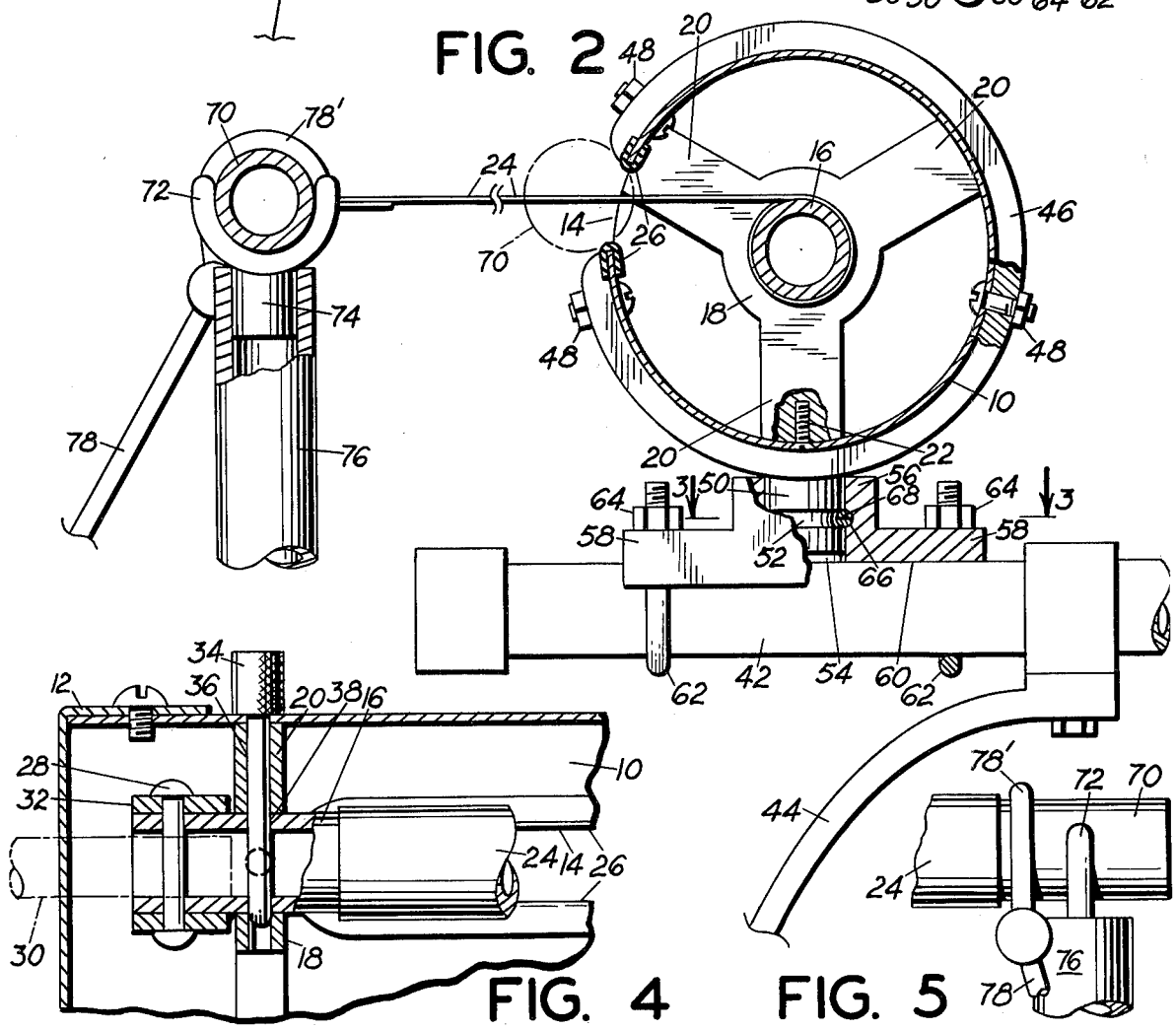

PORTABLE AWNING

BACKGROUND OF THE INVENTION

This invention relates to awnings, and more particularly to a portable awning for detachable mounting on a vehicle for extension therefrom to provide a protective covered area adjacent the vehicle.

Vehicle awnings provided heretofore are characterized by certain deficiencies. They require special mountings which limit their use only to certain types of vehicles and their placement in a specific location on the vehicle. Thus, they may be mounted on the side of the vehicle but not at the rear, or vice versa. They generally preclude the mounting of other attachments, such as a top carrier for a boat. They also require complex framework structures for supporting the outer end of the awning in elevated position when extended. These and other characteristics contribute adversely to excessive cost, limited versatility and use, and cumbersome and time consuming manipulation.

SUMMARY OF THE INVENTION

In its basic concept, the awning of this invention includes a length of flexible awning material wound upon a lockable rotary shaft in an elongated housing for outward extension through an elongated opening in the housing to selected lengths, the extended end being supported in elevated position by vertical posts stabilized by anchor ropes, the housing being supported by spaced, adjustable supports.

It is by virtue of the foregoing basic concept that the principal objective of this invention is achieved; namely, to overcome the aforementioned deficiencies of prior awnings.

Another important object of this invention is the provision of an awning of a class described which is of compact and light weight construction for ready portability and storage and is readily adaptable for mounting in diverse positions on a variety of types of vehicles.

The foregoing and other objects and advantages of this invention will appear from the following detailed description, taken in connection with the accompanying drawing of a preferred embodiment.

BRIEF DESCRIPTION OF THE DRAWING

FIG. 1 is a perspective view of a portable awning embodying the features of this invention, the same being shown in extended position from its mounting on a vehicle.

FIG. 2 is a foreshortened, fragmentary, sectional view taken on the line 2—2 in FIG. 1.

FIG. 3 is a fragmentary sectional view taken on the line 3—3 in FIG. 2.

FIG. 4 is a fragmentary sectional view taken on the line 4—4 in FIG. 1.

FIG. 5 is a fragmentary vertical elevation as viewed from the left in FIG. 2.

DESCRIPTION OF THE PREFERRED EMBODIMENT

The portable awning illustrated includes an elongated hollow housing 10, preferably cylindrical in cross section, closed at its opposite ends by removable end caps 12. An elongated opening 14 in the housing extends parallel to the longitudinal axis thereof and terminates at its opposite ends inwardly of the closure caps.

An elongated shaft 16, either solid or, preferably, tubular in cross section, as shown, is contained within the housing and supported therein adjacent its ends by bearing 18. In the embodiment illustrated, circumferentially spaced arms 20 radiate from each bearing to the inner surface of the housing where they are secured by such means as the screws 22 illustrated.

The elongated shaft is rotatable in the housing, and the inner end of an elongated sheet of flexible awning material 24 is secured thereto. The awning material extends outward through the opening 14. If desired, the edges of the latter may be covered with a beading material 26 to protect the awning material. Thus, selective rotation of the shaft serves to wind up the awning material upon it and to unwind the material from it, as will be understood.

Rotation of shaft 16 may be achieved by any of a variety of conventional means. In the embodiment illustrated, one end of the shaft projecting outwardly from its associated bearing 18 is provided with a transverse pin 28 (FIG. 4) which extends through the hollow bore of the shaft. A conventional crank member 30 is provided with a slotted inner end for reception of the transverse pin, whereby to enable rotation of the shaft. It will be understood that access to the transverse drive pin 28 at either end of the shaft is achieved by removing the end cap 12 of the housing. A pin preferably is provided at both ends of the shaft, to enable driving from either end, and each pin functions additionally to secure a stop collar 32 surrounding the end portion of the shaft, whereby to prevent axial displacement of the shaft relative to its mounting bearings.

Means also is provided for locking the shaft 16 against rotation in the housing. In the embodiment illustrated, such means is provided by a locking pin 34 which is receivable removably in a radial opening 36 in one of the bearing support arms 20. A plurality of circumferentially spaced openings 38 are provided in the shaft for selective registration with the opening 36 in the arm, for reception of the locking pin. Thus, for example, four such openings may be provided in the shaft at 90° intervals, as illustrated.

Means is provided for mounting the housing 10 on a supporting structure. Although the supporting structure may be a building or other stationary object, the awning of this invention has particular utility in association with a vehicle, such as a passenger automobile, a commercial or industrial van type truck, a camper mounted on a pickup truck, and others.

The vehicle illustrated in FIG. 1 is a passenger automobile of the station way type, and it is shown provided with a pair of longitudinally spaced, transverse rods 40 and 42 extending across its top to provide a top carrier for a boat. The rods are secured to the top by conventional means, the type illustrated (FIG. 2) being brackets 44 anchored at one end to rain gutters extending along the opposite sides of the top.

The housing support means illustrated accommodates mounting of the housing 10 along one side of the vehicle, as shown in FIG. 1, or along one end of the vehicle. The support comprises a pair of split rings 46 receivable removably over the housing and secured thereto in longitudinally spaced relation by such means as bolts 48. The space between the ends of each split ring registers with the elongated opening 14 in the housing, whereby said opening remains unobstructed.

Each split ring is secured to a cylindrical post 50 (FIG. 2) provided with an annular groove 52 intermediate its ends. Each post is receivable removably in a bore 54 provided in the central hub portion 56 of a mounting block 58. The under surface of each mounting block is provided with a transverse arcuate groove 60 adapted to seat on one of the rods 40, 42 and a pair of laterally spaced U-shaped clamps 62 encircle the bottom side of the rod and extend upward through openings in the block. The threaded ends of the clamps receive nuts 64 by which the block is secured removably to the rod.

Means is provided for retaining the post 50 within the bore 54 of the block while permitting axial rotation of the post and its associated split ring. In the embodiment illustrated, this is achieved by providing an opening 66 transversely through the hub portion 56 of the block intercepting the bore 54 tangentially. This opening removably receives a retainer pin 68, illustrated in FIG. 3 as a cotter pin. The opening 66 in the hub registers with the annular groove 52 in the post, whereby the pin also intercepts the annular groove. The post thus is secured in the bore against longitudinal displacement while permitting axial rotation.

Thus, when it is desired to mount the housing 10 along side the vehicle, as illustrated in FIG. 1, each of the pair of mounting blocks 58 is rotated relative to the associated ring 46 to align the groove 60 parallel to the plane of the ring. The blocks then are mounted one on each of the transverse rods 40 and 42, with the plane of each split ring disposed parallel to its associated rod. The clamps 62 then are tightened.

On the other hand, if it is desired to mount the housing adjacent the rear end of the vehicle for extension of the awning rearwardly thereof, both of the mounting block are secured to the rearward transverse rod, at spaced positions, merely by rotating each mounting block relative to its split ring 46 to dispose the arcuate groove 60 perpendicular to the plane of the associated split ring.

Simplified means also is provided for supporting the extended end of the awning material 24 in desired position of elevation above the ground. In the embodiment illustrated, the outer transverse edge of the awning material is reinforced by an elongated rod 70 the opposite ends of which extend beyond the lateral edges of the awning material. Each of these extended portions of the rod is arranged to seat removably in a U-shaped yoke 72 secured to a plug 74 pressed into the upper end of an elongated post 76. The bottom end of the post rests upon the ground.

Each of the posts is stabilized in its vertical position of support, by means of a length of rope 78. One end of the rope conveniently is formed with a loop 78' adapted to be slipped over the projecting end portion of the rod 70, before the post 76 is installed. The loop thus is retained between the lateral edge of the awning material 24 and the yoke 72, as illustrated in FIG. 5.

Each rope then is extended angularly outward and downward (FIG. 1) where its bottom end is anchored to the ground, as by means of an anchor peg, heavy, weight, or other suitable means.

It is to be noted that the awning material 24 may be extended to any desired length from the housing 10, since the shaft 16 may be secured against rotation by the locking pin 34 whenever any one of the openings 38 in the shaft registers with the opening 36 in the bearing arm 20.

Retraction of the awning is effected by removing one of the end caps 12 of the housing, installing the crank 30 and rotating the shaft 16 in the direction to wind in the awning material 24 upon the shaft until the transverse rod 70 at the outer end of the awning material seats across the elongated opening 14 in the housing. For this purpose, it will be understood that the transverse rod is larger in diameter than the width of the opening in the housing. The locking pin 34 then is reinstalled in registering openings 36, 38 and the crank removed and the cap 12 reinstalled.

The posts 76 and anchor ropes 78, having been removed from the transverse rod 70 before retraction of the awning material, may conveniently be stored within the housing 10, between the coil of awning material and the inner surface of the housing, by removal of one of the end caps 12.

It will be observed that removal of the housing 10 from the vehicle may be achieved simply by removing the keeper pin 68 from each block to permit retraction of the post 50.

From the foregoing it will be appreciated that the present invention provides a portable awning of compact, light-weight and economical construction. It is capable of mounting upon a variety of structures and has particular utility in association with vehicles, being capable of mounting along one side or one end of the vehicle, to provide a protective covered area adjacent the vehicle.

It will be apparent to those skilled in the art that various changes may be made in the size, shape, type, number and arrangement of parts described hereinbefore without departing from the spirit of this invention.

Having thus described my invention and the manner in which it may be used, I claim:

1. A portable awning, comprising:
  a. an elongated housing having an elongated opening through its side,
  b. a pair of split rings encircling the housing at longitudinally spaced positions, the spacing between the ends of each of the split rings registering with the elongated opening in the housing,
  c. a cylindrical post extending from each ring and having an annular groove therein, a base member having a bore receiving the post rotatably therein, and pin means on the base member extending tangentially into said bore and annular groove for retaining the post in the bore against longitudinal displacement while affording axial rotation of the post relative to the base member,
  d. means engaging the base member for securing the latter to a support,
  e. an elongated rotary shaft mounted in the housing,
  f. an elongated sheet of flexible awning material having an inner transverse edge secured to the shaft for winding the material upon and unwinding it from the shaft, the outer transverse edge of the material extending outwardly through the elongated opening in the housing for movement of the material between a retracted position wound upon the shaft and an extended position projecting from the housing, and
  g. lock means releasably interengaging the housing and shaft for securing the latter releasably against rotation, whereby to secure the awning material in diverse conditions of extension from the housing.

2. The portable awning of claim 1 for use on a vehicle provided with a rod mounted on its top, wherein each base engaging means comprises a clamp member adapted to secure its associated base member to the rod, whereby to mount the housing parallel to the rod.

3. The portable awning of claim 1 for use on a vehicle provided with a pair of spaced rods mounted on its top, wherein each base engaging means comprises a clamp member adapted to be secured to one of the rods, whereby to mount the housing perpendicular to the pair of rods.

4. The portable awning of claim 1 including an elongated reinforcing rod secured to the outer transverse edge of the awning material and projecting beyond the side edges of the latter, a pair of elongated posts having bottom ends arranged to engage the ground and upper ends arranged to engage the rod adjacent the opposite ends of the latter and outwardly of the side edges of the awning material for supporting the outer end of the awning material elevated above the ground, and an anchor rope associated with each post and arranged at one end to engage the rod between the post and the side edges of the awning material and at the opposite end to be anchored to the ground at a point outwardly of the post.

* * * * *